United States Patent [19]

Martinek

[11] 4,374,447
[45] Feb. 22, 1983

[54] SIX-WHEEL SPINNING SHIRRING HEAD

[75] Inventor: Thomas W. Martinek, Covington, Ind.

[73] Assignee: Teepak, Inc., Chicago, Ill.

[21] Appl. No.: 136,658

[22] Filed: Apr. 2, 1980

[51] Int. Cl.$^3$ .......................................... A22C 11/00
[52] U.S. Cl. ...................................... 17/1 R; 17/42; 17/49
[58] Field of Search ....................... 17/49, 41, 42, 1 R; 53/581, 575, 576

[56] References Cited

U.S. PATENT DOCUMENTS

| 2,983,949 | 5/1961 | Matecki | 17/42 |
| 3,310,833 | 3/1967 | Clement | 17/42 |
| 3,986,230 | 10/1976 | Riegler | 17/42 |
| 4,085,483 | 4/1978 | Winkler | 17/42 |
| 4,176,204 | 11/1979 | Winkler | 426/140 |
| 4,200,960 | 5/1980 | Kollross | 17/42 |

FOREIGN PATENT DOCUMENTS

| 28785 | 5/1981 | European Pat. Off. . |
| 2912474 | 9/1980 | Fed. Rep. of Germany . |
| 784443 | 10/1957 | United Kingdom | 17/42 |
| 1242144 | 8/1971 | United Kingdom . |

Primary Examiner—Willie G. Abercrombie
Attorney, Agent, or Firm—Michael L. Dunn; Paul A. Leipold

[57] ABSTRACT

A shirring head wherein there are a plurality of shirring wheels spaced about the circumference of a shirring mandrel and so mounted that the shirring wheels may be individully driven in unison with one another while at the same time the faces of the shirring wheels opposing the shirring mandrel extend substantially continuously about the shirring mandrel. The shirring wheels are carried by a supporting head which is mounted for rotation so as to rotate the shirring wheels about the axis of the shirring mandrel in addition to the rotation of the shirring wheels about their own axes. A differential drive is provided wherein the speed of rotation of the shirring wheels is modified in accordance with the speed and direction of rotation of the supporting head. The differential drive provides for an input to the drive for the shirring wheels from the drive for the supporting head.

24 Claims, 10 Drawing Figures

SIX-WHEEL SPINNING SHIRRING HEAD

This invention relates in general to new and useful improvements in shirring heads for shirring tubular films.

Tubular films of collagen and cellulose are used extensively as sausage casings. These are initially formed as continuous tubes which are rolled flat to form "reels". The tubular films are then opened over a mandrel and are shirred on that mandrel so that many feet of the tubular casings may be formed into a stick having a length on the order of 12 to 18 inches.

Shirring is effected by rotating wheels which normally are provided with lugs which cooperate with one another so as to effect a most efficient folding of the tubular films. Such prior apparatus is generally disclosed in the U.S. patents to Martinek U.S. Pat. No. 3,454,981 of July 16, 1969 and Arnold U.S. Pat. No. 3,461,484 of Aug. 19, 1969.

This invention most particularly relates to a shirring head which has a plurality of shirring wheels disposed in circumferentially spaced relation about an associated mandrel. The shirring wheels are mounted for individual rotation in unison, and further for rotation as a unit about the axis of the shirring mandrel. Such a shirring head is broadly disclosed in the patent to Winkler U.S. Pat. No. 4,085,483 of Apr. 25, 1978.

This invention most particularly has to do with the number of shirring wheels and their arrangement so that the most casing can be shirred in the least length of strand with the least damage to the film.

Concerning the number of shirring wheels, the theoretical optimum is an infinite number of infinitesimal thickness disposed equiangularly about the axis of the mandrel. This is so because a tangential linear force is being used to produce a rounded configuration. Since the element for transmission of the force has a thickness, it must of necessity have a curvature at its end whereby the force is transmitted. But the velocity of points along the curvature varies in proportion to the distance of the points from the axis of rotation. Thus, the points at the extremities of the arc travel faster than the point at the center of the arc, and furthermore the points at the extremities intersect radial lines from the mandrel to the outer diameter of the strand. These non-aligned and non-uniform velocity forces cause stresses in the casing which weaken it. Obviously, the greater the number of wheels and the thinner the shirring element on the wheel, the less the damage to the film. For practical purposes, the number of wheels is limited by the size of the machine and the rigidity of the shirring element. A reasonable compromise appears to be six wheels of about ½ inch thickness each.

Concerning the arrangement of the shirring elements, it is obvious that they should be disposed about the shirring mandrel equiangularly. But, in addition, they should rotate about the axis of the mandrel so as to impart a radial thrust as well as the linear or longitudinal thrust which causes the main folding as disclosed in Arnold U.S. Pat. No. 3,461,484. The radial thrust is imparted by the device of Winkler U.S. Pat. No. 4,085,483, but the control is not available. The speed and direction of rotation of the head are important to production of the optimum strand. The rotational force should be such that all secondary pleats are laid down in the same direction to the same extent. Secondary pleats are those which are widest at the bore of the strand and fade to no fold at the OD of the strand. Such pleats are inherent and occur in all strands having the helical pleat pattern of Arnold including those so described by Regner, et al. U.S. Pat. No. 4,001,914.

The goals then of this invention are to provide an apparatus which can produce a shirred strand of casing having the least possible damage done during shirring, but which also produces uniform folding of the secondary pleats so that higher density and more esthetically appealing strands are also produced.

With this in mind, an apparatus was provided with six wheels of one-half inch width and of known composition mounted uniquely on six unique angle drives in turn mounted on a rotatable plate with power inputs both to the shirring wheels and to the plate in a manner wherein the rotation of the plate could be changed at will without affecting the rotation rate of the wheels. To achieve this condition, a novel drive system employing a differential gear train with two inputs and two outputs was provided. One input drives the wheels through its output. The other input drives the plate through its output. As the plate input is changed, the wheel output of the differential changes to compensate for the fact that the plate rotation changes the effective wheel rotation. With this arrangement, the head can be caused to spin in either direction at any rate without altering the wheel input and with the wheel speed remaining constant.

In accordance with this invention, the shirring wheels are each carried by a right angle drive which is mounted on a supporting head. Each right angle drive is of such a construction wherein the respective shirring wheel carried thereby does not interfere with the next adjacent right angle drive, and thus as many as six shirring wheels may be mounted around a small diameter mandrel and it being feasible to increase the number of shirring wheels when the diameter of the mandrel increases.

Each right angle drive includes a simple housing which has rotatably journalled therein a drive shaft. The drive shaft carries at its end within the housing a gear which is meshed with a further gear disposed at right angles thereto and which further gear is secured to a mounting collar for the respective shirring wheel. The further gear and mounting collar are rotatably journalled on a fixed shaft. The fixed shaft projects a minimal distance to one side of the housing, and thus mounts the respective shirring wheel immediately alongside the housing parallel to the driving shaft therefor. Thus, the housing may occupy the space between adjacent shirring wheels.

The driving shaft has that end thereof provided with the gear within the housing supported by a pin which is journalled within the free end thereof and which pin serves the dual function of anchoring the fixed shaft against movement relative to the housing.

Another feature of the invention is the specific construction of the shirring head wherein the supporting head is provided with a supporting plate and the entire shirring head is mounted for rotation about the axis of the shirring mandrel by a bearing located in the general plane of the supporting plate. The radially inner part of the supporting plate is provided with an axially extending support sleeve which serves to mount for rotation the drive means for the individual right angle drives. The right angle drives extend to one side of the supporting plate and the drive means therefor are disposed on the opposite side of the supporting plate.

A further and important feature of the invention is the provision of a differential drive for modifying the speed of rotation of the shirring wheels in accordance with the direction and speed of rotation of the entire shirring head about the shirring mandrel. A separate drive is provided for rotating the shirring head and for rotating in unison the shirring wheels about their individual axes. These separate drives are driven from a differential drive unit which includes two input shafts and two output shafts. The first input shaft is directly coupled to a first of the output shafts and serves to drive the shirring head in a selected rotational direction and at a selected speed. The second of the input shafts is coupled to a second of the output shafts by way of a differential gearing. The second output shaft is coupled to the individual shirring wheels through their right angle drives for rotating the shirring wheels in the same direction and at the same speed. However, the second input shaft is coupled to the second output shaft by a differential gearing which also receives an input thereto from the first input shaft. Thus, the first input shaft has a direct control over the speed of rotation of the second output shaft. When the shirring head is rotated in a direction to complement the function of the shirring wheels, the shirring wheels will be driven at a slower rate than that called by the second input shaft, and when the direction of rotation of the shirring head is one which restricts the function of the shirring wheels, the drive of the shirring wheels is such so as to increase the speed thereof.

With the above and other objects in view that will hereinafter appear, the nature of the invention will be more clearly understood by reference to the following detailed description, the appended claims, and the several views illustrated in the accompanying drawings.

Figure 1:
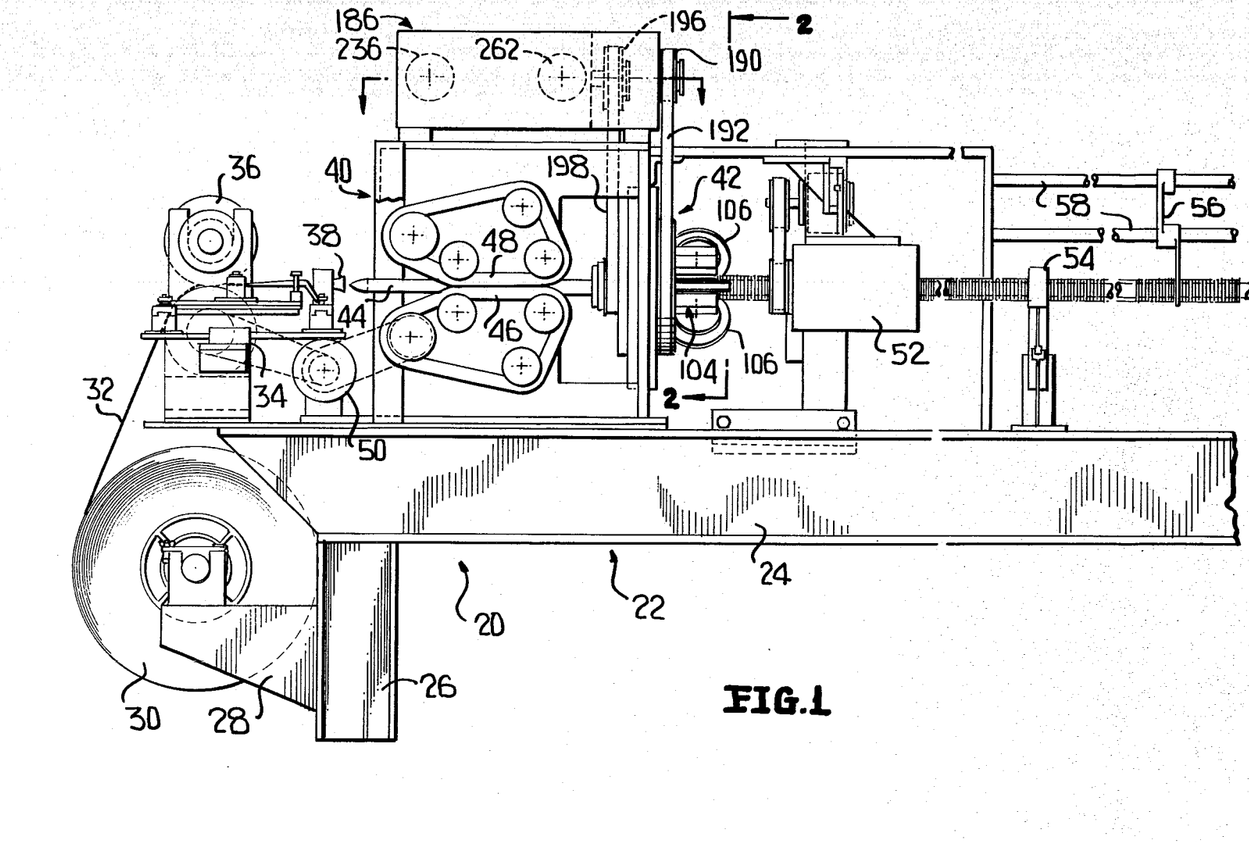
FIG. 1 is a side elevational view of a conventional shirring machine incorporating therein the shirring head of this invention.

Referring now to the drawings in detail, it will be seen that there is illustrated in FIG. 1 an overall shirring apparatus generally identified by the numeral 20. The shirring apparatus conventionally includes a frame generally identified by the numeral 22 and including a horizontal frame section 24 which is supported by suitable legs 26.

The legs 26 at one end of the frame 22 carry a support 28 for a reel 30 of the casing 32. The casing 32 extends over a measuring roll 34 against which it is held by a squeeze roll 36. The casing 32, which is flat and is in the form of reelstock, is conventionally inflated as at 38.

The frame 22 includes a superstructure 40 which carries a shirring head, generally identified by the numeral 42, formed in accordance with this invention.

A shirring mandrel 44 is mounted within the shirring head 42 and has a leading end immediately adjacent the point where the casing is inflated so as to receive the inflated casing. The inflated casing is moved along the shirring mandrel 44 by a pair of feed belts 46, 48. A motor 50 is provided for driving both the measuring roll 34 and the feed belts 46 and 48 in a conventional manner.

Downstream of the shirring head 42 is a combined strand spinner and holdback mechanism 52.

Downstream of the holdback device 52 are suitable clamps 54 of which only one is shown. The clamps 54 support the mandrel 44 in a conventional manner. Between the clamps 54 is a compression member 56 which is mounted on rods 58 extending above the frame member 24 from the superstructure.

Inasmuch as the function and operation of the shirring machine 20, as previously described, is conventional except for the operation of the shirring head 42 and the construction thereof, no further specific description of the operation of the shirring machine or the function thereof is believed to be required here.

Figure 2:
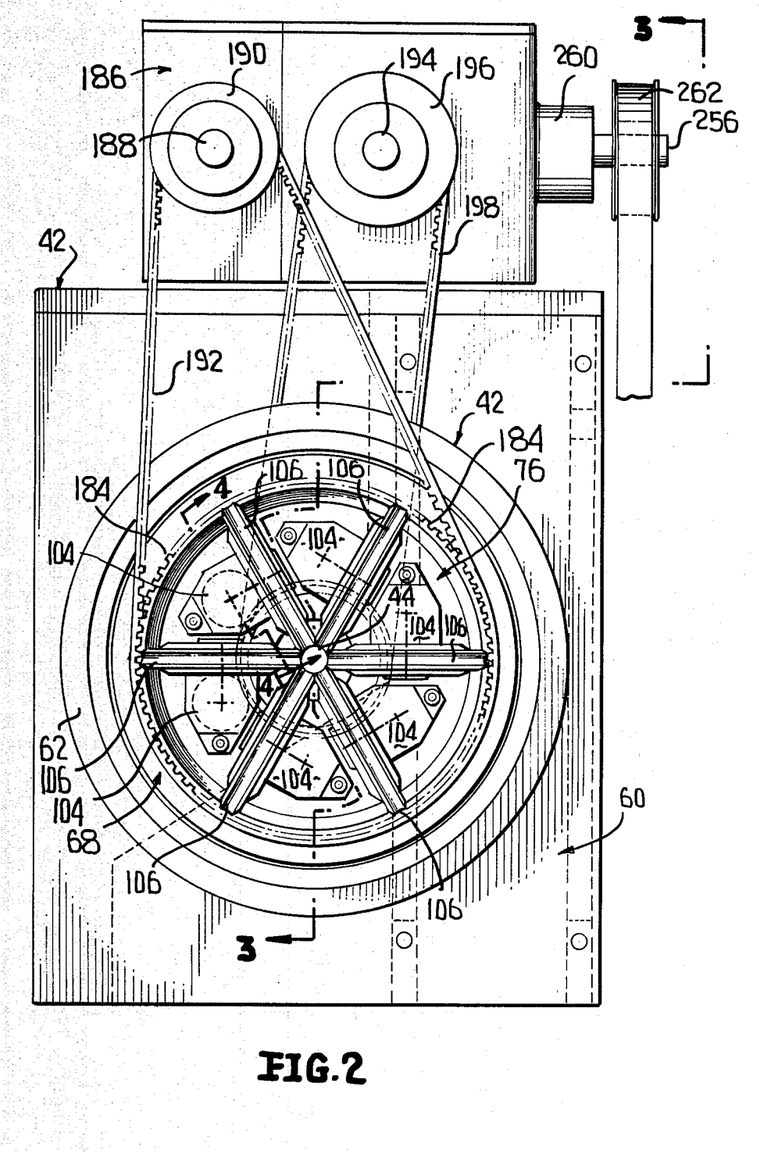
FIG. 2 is an enlarged transverse vertical sectional view taken generally alone the line 2—2 of FIG. 1, and shows most specifically the details of the shirring head.
Figure 3:
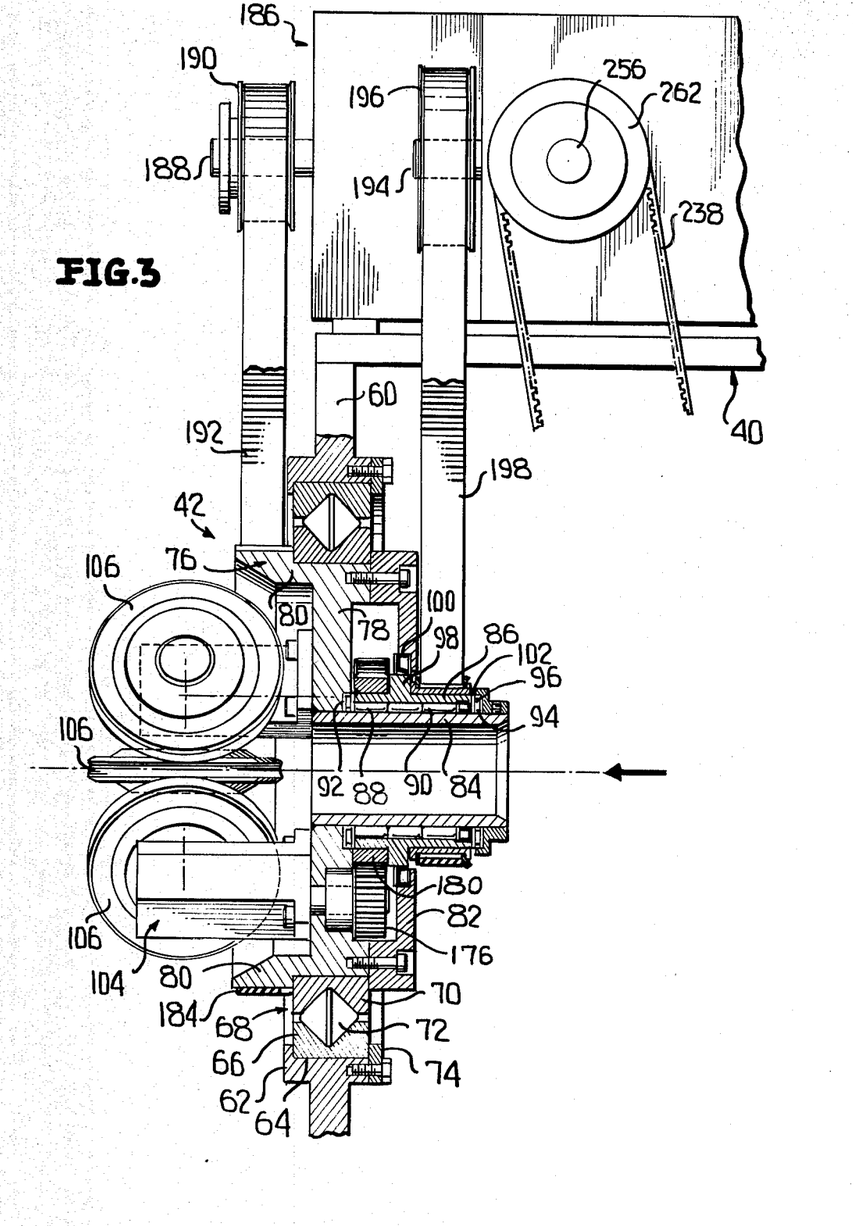
FIG. 3 is an enlarged fragmentary vertical sectional view taken generally along the line 3—3 of FIG. 2, and shows most specifically the details of the shirring head.

The shirring head 42, as best illustrated in FIG. 2, is carried by an upstanding frame member 60 which forms part of the superstructure 40. The frame member 60, as is best shown in FIG. 3, has an annular flange 62 which defines a seat 64 for an outer race 66 of the bearing assembly 68. The bearing assembly 68 also includes an inner race 70 and a plurality of bearing rollers 72. The bearing assembly is so constructed wherein it permits rotation of the shirring head 42 within the frame member 60 while maintaining the axial position of the shirring head 42.

It is to be noted that the outer race 66 is removably mounted within the flange 62 by means of a retaining collar 74.

The shirring head 42 includes generally a supporting head identified by the numeral 76. The supporting head 76 includes a centrally positioned supporting plate 78 which lies in the same common plane as the frame member 60 and has an outer flange portion 80. The outer flange portion 80 has seated therein the inner race 70 which is secured in place by means of an annular plate 82.

The supporting head 76 also includes a radially inner tubular support member or sleeve 84 which extends through the supporting plate 78 and is fixedly secured thereto. The sleeve 84 has an internal diameter of a size freely to receive the stirring mandrel 44 and an associated tubular film to be shirred.

The support sleeve 84 has rotatably journalled therein a drive member 86 by way of bearings 88 and 90. The drive member 86 is axially positioned on the support sleeve 84 by a thrust bearing 92 which engages the supporting plate 78, and a thrust bearing 94 which engages a positioning flange or collar 96 which is adjustably secured on the support sleeve.

It is to be noted that the drive member 86 has an intermediate, radially outwardly extending rib 98 which is generally aligned with the inner portion of the annular plate 82 and has engaged therewith a seal 100 carried by the annular plate 82. A seal between the drive member 86 and the support sleeve 84 is effected by a sealing element 102 disposed between the bearings 90 and 94.

Extending from the left side of the support plate 78, that is from the side thereof opposite from the drive member 86, is a plurality of right angle drive assemblies each identified by the numeral 104. Each of the assemblies 104 includes a shirring wheel 106 which, although it has been illustrated with a continuous perimeter, will be of the toothed type conventionally known in the art. As is clearly shown in FIG. 2, there are six shirring wheels 106 and the shirring wheels are equally spaced about the shirring mandrel 44. The mounting of the shirring wheels 106 is such that adjacent shirring wheels are in substantially touching relation and the relationship of the number of shirring wheels, the thickness of the shirring wheels, and the circumference of the shirring mandrel present a shirring surface substantially entirely around the circumference of the shirring mandrel.

Reference is now made to FIGS. 4-7 wherein the details of a right angle drive assembly 104 are specifically illustrated.

Figure 4:
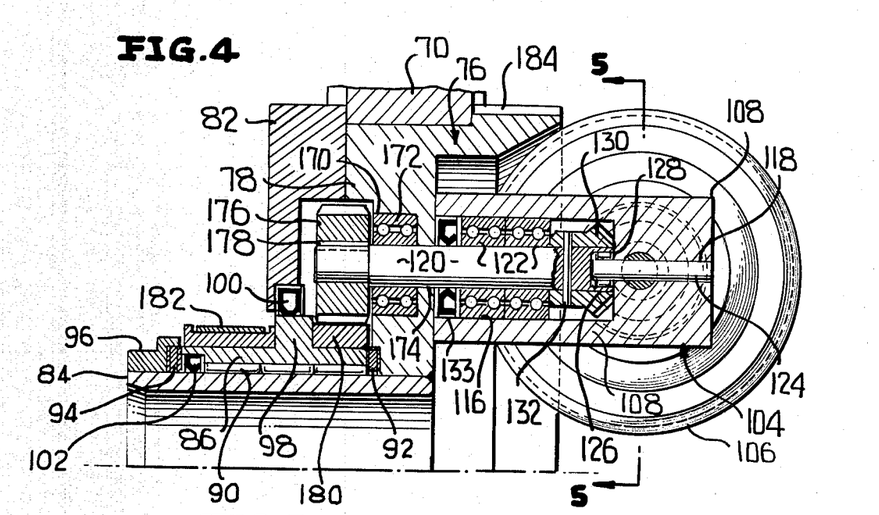
FIG. 4 is an enlarged fragmentary sectional view taken generally along the line 4—4 of FIG. 2, and shows the general mounting of the right angle drive and support assembly for the shirring wheel in accordance with this invention.
Figures 5, 6, 7:
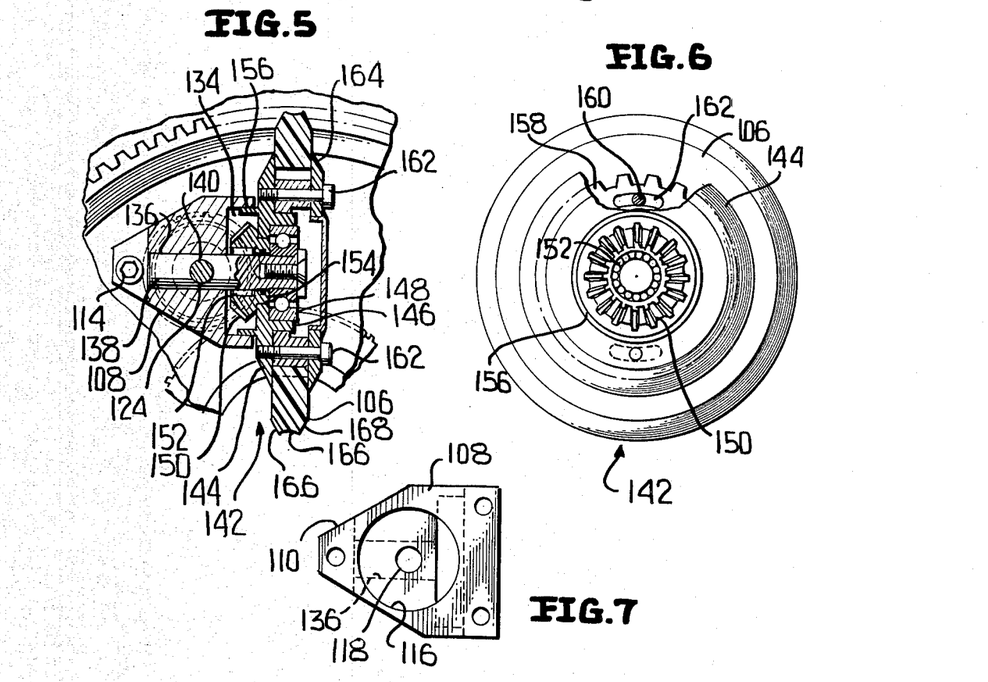
FIG. 5 is an enlarged fragmentary sectional view taken along the line 5—5 of FIG. 4, and shows specifically the mounting of the shirring wheel on its drive assembly.
FIG. 6 is an elevational view of the shirring wheel and the support shaft therefor removed from the associated housing.
FIG. 7 is an end elevational view of the support housing per se.

As will be specifically described hereinafter, each right angle drive assembly includes a simple housing which has rotatably journalled therein a drive shaft. The drive shaft carries at its end within the housing both a bevel gear on the OD and a roller bearing cavity within the shaft. The bevel gear meshes with a further bevel gear at a right angle thereto. The cavity receives a pin which acts as a bearing shaft for rollers displaced within the cavity. Thus the drive shaft bevel gear is supported on both sides, rendering deflection and consequent backlash negligible even under heavy loading.

The further (driven) bevel gear is made an integral part of a shirring wheel hub which hub has a cavity for a ball bearing and which bevel gear has a cavity for roller bearings. Both bearings are held in place by a shaft fixed in the housing immediately adjacent the bevel gear. In this manner, the driven bevel gear is supported rigidly and the deflection and consequent backlash are negligible even under heavy loading.

With the above gear and bearing arrangement, it is possible to design very small right-angle gear drives which can carry the loads of larger drives without excessive wear or backlash. The small size is necessary to utilization of as many shirring wheels as can be fit into the space provided.

Each assembly 104 includes a housing 108 of a generally triangular cross section, as is shown in FIG. 7. At one end the housing 108 is provided with mouting flanges 110 and 112 which receive fasteners 114 which secure the housing 108 to the adjacent face of the supporting plate 78.

That part of the housing 108 facing the supporting plate 78 is hollow, having a bore 116 formed therein as is best shown in FIG. 4. A reduced diameter bore 118 extends from the inner end of the bore 116 through that end of the housing 108 disposed remote from the supporting plate 78. The bore 118 is disposed coaxial with the bore 116.

A drive shaft 120 is rotatably journalled within the bore 116 by way of a pair of double row ball bearings 122. Further, the end of the drive shaft 120 within the housing 108 is supported by means of an anchoring pin 124 which extends through the bore 118 and into the bore 116. To this end, the right end of the drive shaft 120, as viewed in FIG. 4, is provided with a bore 126 into which the pin 124 projects. A bearing 128 is disposed between the drive shaft 120 and the pin 124 so as to permit the pin 124 to support the drive shaft 120 free end. This arrangement allows a heavy load to be imposed with little deflection and hence little backlash.

The free end of the drive shaft 120 carries a bevel gear 130 which is secured to the drive shaft 120 by a pin 132. The opposite end of the bore 116 is sealed by a ring seal 133 which surrounds the drive shaft 120.

Adjacent the end of the housing 108 disposed remote from the supporting plate 78, one side of the housing is provided with a large diameter bore 134, as is best shown in FIG. 5. A smaller diameter bore 136 extends transversely through the housing 108 in coaxial relationship with the bore 134. A first supporting shaft 138 extends through the bore 136 into and out through the bore 134. The bore 136 intersects the bore 118 at right angles thereto and has a bore 140 therethrough in alignment with the bore 118 so that the retaining pin 124 may extend through the fixed shaft 138 and retain it in position in the manner clearly shown in FIGS. 4 and 5.

At this time it is particularly pointed out that the axes of the drive shaft 120 and the fixed shaft 138 lie in a common plane with the axis of the fixed shaft being disposed at right angles to the axis of the drive shaft.

The fixed shaft 138 has rotatably journalled thereon a shirring wheel unit, generally identified by the numeral 142. The shirring wheel unit 142 includes one of the afore-described shirring wheels 106 and includes a mounting collar 144 having a hub portion 146. The hub portion 146 serves the dual function of centering the shirring wheel 106 and mounting a bearing assembly 148, the bearing assembly 148 being carried by the fixed shaft 138.

The mounting collar or flange 144 carries a bevel gear 150 which is meshed with the bevel gear 130. The bevel gear 150 is further rotatably journalled on the fixed shaft 138 by means of a bearing assembly 152. A seal 154 is carried by the mounting flange and engages the fixed shaft 138 between the bearing units 152 and 148.

At this time it is also pointed out that the mounting flange 144 generally closes the bore 134 and has projecting from one face thereof a sleeve portion 156 which is telescoped within the bore to form a general seal therewith.

The shirring wheel 106 is preferably formed of an elastomeric material and is molded on a hub 158 which has a toothed periphery to facilitate the interlocking of the hub with the elastomer. The hub 158 is angularly adjustably positioned relative to the mounting flange 144 and the gear 150 by providing the hub 158 with arcuate slots 160 through which securing fasteners 162 extend. The shirring wheel 106 is clamped against the mounting flange 144 by means of a collar 164 with the fasteners 162 having heads engaging the collar 164 and the opposite ends of the fasteners 162 being threaded into the mounting flange 144.

As will be readily apparent from FIG. 2, the right angle drive assemblies 104 are so constructed to occupy a minimun of space and thus permit the mounting of a large number of shirring wheels 106 in a very confined space. Such a mounting and drive arrangement for each shirring wheel 106 permits shirring wheels of conventional thickness to be disposed in substantially touching relation so as to present a shirring surface substantially continuously about the circumference of the shirring mandrel 44. With respect to this, as is clearly shown in FIG. 5, the peripheral face of the shirring wheel 106 is machined so as to be arcuate as at 166 to correspond to the periphery of the shirring mandrel 44 while the opposite side faces of the shirring wheel are tapered as at 168 to provide clearance relative to adjacent shirring wheels.

Referring once again to FIG. 4, it will be seen that the face of the support plate 78 opposite from that receiving the housings 108 is provided in alignment with each assembly 104 with a bore 170 in which there is seated a bearing unit 172. There is further a bore 174, coaxial with the bore 170, entirely through the supporting plate 78. Thus, when the individual assembly 104 is mounted on the supporting plate 78, the drive shaft 120 may extend through the supporting plate 78 and further be supported for rotation by means of the bearing 172. The left end of each drive shaft 120 is provided with a drive gear 176 which is fixedly secured to the drive shaft 120 in driving relation by means of a key 178.

As is clearly shown in FIG. 4, the previously described drive member 86 is provided with a ring gear 180 aligned with the gears 176 for simultaneously driving all of the drive shafts 120 and rotating all of the shirring wheels 106 in the same direction and at the same speed upon rotation of the drive member 86 relative to the supporting head 76.

It is also to be noted at this time that the drive member 86 carries on the side of the rib 98 remote from the gear 99 a toothed sprocket 182 for a toothed drive belt. In this manner the drive member 99 may be rotated independently of the supporting head 76 so as directly to drive the shirring wheels 106 about their relatively fixed shafts 138.

It is also to be noted that the supporting head 76 is provided on the side thereof remote from the cover plate 82 with the toothed sprocket 184 for a further drive belt. The toothed sprocket 184 serves to effect rotation of the supporting head 76.

The shirring head 42 is driven by means of a differential drive unit, generally identified by the numeral 186, which is mounted on the top of the superstructure 40 as is clearly shown in FIGS. 2 and 3. The differential drive unit 186 includes a first output shaft 188 having thereon a drive sprocket 190 aligned with the sprocket 184 and drivingly connected thereto by means of a drive belt 192. The differential drive unit 186 also includes a second output shaft 194 which carries a drive sprocket 196 which is aligned with the drive sprocket 182 and is drivingly connected thereto by means of a drive belt 198. It is to be understood that the drive belts 192 and 198 are of the toothed type so as to provide for an interlocking engagement with their respective sprockets, as is clearly shown in FIG. 2 so that there is a positive driving of the components of the shirring head 42.

Figures 8, 9:
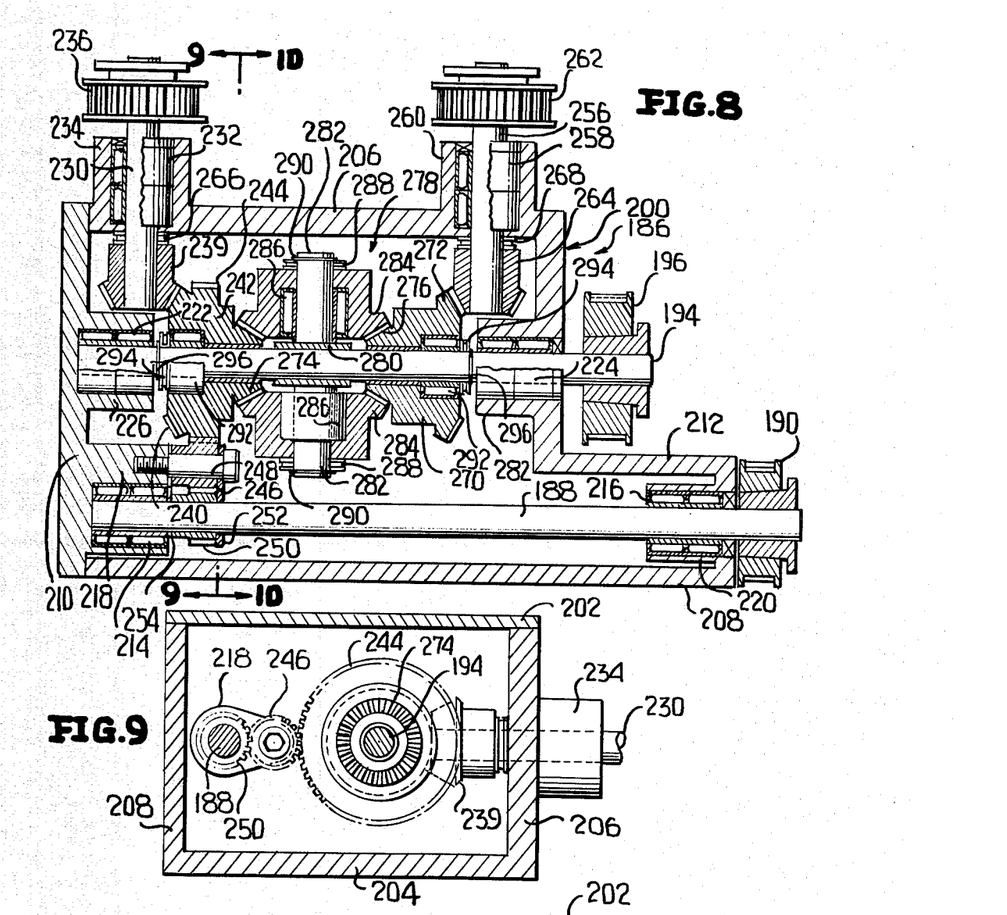
FIG. 8 is a longitudinal sectional view on an enlarged scale taken generally along the line 8—8 of FIG. 1, and shows the general details of the drives for the shirring head and the shirring wheels carried thereby.
FIG. 9 is a fragmentary transverse vertical sectional view taken generally along the line 9—9 of FIG. 8, and shows generally the details of the drive between the first input shaft and the first output shaft.
Figure 10:
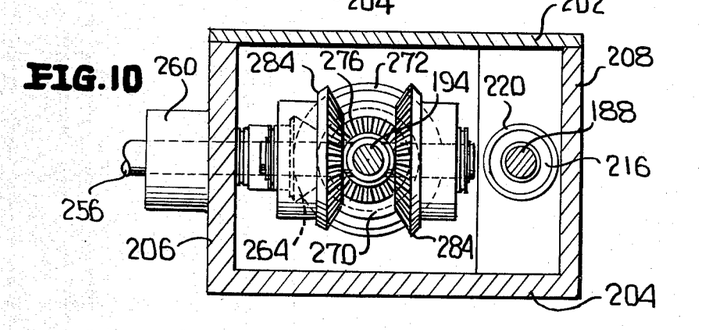
FIG. 10 is a fragmentary sectional view similar to FIG. 9 and taken along the line 10—10 of FIG. 8, showing generally the details of the differential drive for the second output shaft.

The differential drive unit 186 includes a suitable housing 200 which is generally shown in FIGS. 8-10 and includes a removable cover 202. The housing 200 includes a bottom wall 204 having extending upwardly from opposite sides thereof side walls 206 and 208. The housing further includes an end wall 210 and a stepped end wall 212 as is clearly shown in FIG. 8.

The first output shaft 188 extends substantially the full length of the housing 200 and opens out through the stepped end wall 212. The shaft 188 is supported by suitable bearings 214 and 216 which are carried by projections 218 and 220 on the end walls 210 and 212, respectively.

The second output shaft 194 is arranged in parallel relation to the output shaft 188 and also extends generally the full length of the housing 200 and projects out through the stepped end wall 212. The stepping of the end wall 212, as is clearly shown in FIG. 8, permits the drive sprockets 190 and 196 to be offset generally along the axis of the shirring machine, as is clearly shown in FIG. 3.

The shaft 194 is rotatably journalled in bearings 222 and 224 carried by inwardly directed projections 226 and 228 of the end walls 210 and 212, respectively.

The end wall 206 has extending therethrough a first input shaft 230 which is rotatably journalled in suitable bearings 232 carried by an outward projection 234 of the side wall 206. The input shaft 230 carries a drive sprocket 236 which is driven by way of a drive belt 238 of a suitable drive motor (not shown). The inner end of the input shaft 230 carries a bevel gear 239 which is meshed with a bevel gear portion 240 of a gear member 242. The gear member 242 is suitably rotatably journalled on the output shaft 194 for rotation relative thereto and has a spur gear portion 244 which is meshed with a direction reversing gear 246 which is rotatably journalled on a shaft defining shoulder bolt 248 carried by the end wall projection 218. The gear 246 is in turn meshed with a gear 250 which is suitably keyed onto the output shaft 188. The gears 246 and 250 are maintained in alignment by means of a thrust plate 252 which is positioned by the shoulder bolts 248. A further suitable thrust plate 254 is positioned between the gears 246 and 250 and the inner end of the projection 218.

From the foregoing it will be seen that the output shaft 188 is driven from the input shaft 230 through the gears and gear portions 239, 244, 246 and 250.

A second input shaft 256 also extends through the side wall 206 and is rotatably journalled in bearings 258 carried by an outwardly projecting projection 260. An outer end of the shaft 256 carries a drive sprocket 262 which is driven in any suitable manner by way of a toothed belt (not shown) from a power source. The inner end of the shaft 256 is provided with a bevel gear 264 in the same manner as the shaft 230. It is to be noted at this time that the gears 239 and 264 are positioned relative to the side wall 206 by way of thrust bearings 266 and 268, respectively.

A gear member 270 is rotatably journalled on the output shaft 194 and has a first bevel gear portion 272 meshed with the bevel gear 264 so as to be driven thereby.

The gear member 242 has a bevel gear portion 274 and the gear member 270 has a bevel gear portion 276 which are disposed generally in opposed relation and are mounted concentric with the shaft 194 for rotation thereabout. The bevel gear portions 274 and 276 form parts of a differential gearing generally identified by the numeral 278.

The differential gearing 278 includes a drive sleeve 280 which is fixed to the output shaft 194 for driving the same. The sleeve 280 has extending therefrom in diametrically opposite relation a pair of shafts 282 on which there are mounted for rotation bevel gears 284. Each of the bevel gears 284 meshes with the bevel gear portions 274 and 276.

It is to be noted that the bevel gears 284 are journalled on the shafts 282 by means of bearings 286 and are axially positioned by means of thrust bearings 288 together with a retaining ring 290. In a like manner, the differential gearing 278 is positioned on the output shaft 194 by the gear members 242 and 270 being journalled on the shaft 194 by way of suitable bearing means 292 and being axially positioned by means of thrust bearings 294 and retainers 296.

It will be readily apparent that when the input shaft 230 is stationary and the input shaft 256 is rotated, the output shaft 194 will be driven through the differential gearing 278 at a preselected rate. However, when the input shaft 230 is rotated in one direction, it will speed up the output shaft 194 and when rotated in the opposite direction it will slow down the output shaft 194.

Inasmuch as the output shaft 188 is coupled to the supporting head 76 to effect selective rotation thereof, it will be seen that the input shaft 230 directly controls the rotation of the supporting head 76 so as directly to control the rotation of the shirring wheels 106 about the axis of the shirring mandrel 44. On the other hand, the input shaft 256 directly controls the rotation of the shirring wheels 106 about their individual fixed shafts 138 so that when the supporting head 76 is held stationary, the shirring wheels 106 will function in the normal manner.

In the practical case of driving the wheels for a shirring machine, one wants the wheels to rotate at a preselected speed in one direction only, that direction being the one to cause advancement of the casing into the abutment required for shirring. In the ideal system where the head is also spun, one would be able to spin the head at various speeds and in either direction without disturbing the shirring rotation in the least. This variability is a major advantage since the rate and direction of spin which produce the best product varies with the size of the casing and the mandrels as well as the speed of shirring, etc. In other words, the optimum spin rate and direction varies with the shirring conditions and the product produced. For example, if the strand spinner shown at 52 in FIG. 1 is to be used, the direction of head spin may advantageously be directed oppositely to control secondary pleating better. The amount of spin required to control secondary pleating varies with shirring speed as well as casing size. The optimum spin and direction are also affected by the contact angle off the shirring element. It thus becomes evident that a system whereby spin rate and direction can be caried at will without disturbing shirr rate is highly desirable.

This highly desirable feature is accomplished by using a planetary gear system to drive the shirring wheels and a differential system to drive the planetary system. The differential is symmetrical with respect to output shaft for the wheel drive; that is pulley 196. This means that the rotational input of one shaft has the same gear ratio to the same output shaft (pulley 196). Since each train to the same shaft is engaged at opposing ends of the cross gear 284, the rotational input of one is subtracted from the output if input directions are the same, but added if input directions are opposed. Thus, clockwise rotation at the same RPM for both input shafts 230 and 256 results in zero output. In this case, different gear 284 on the cross rotates but the cross is stationary. If, on the other hand, one shaft is rotated clockwise and the other shaft counterclockwise, the output shaft rotational speed is doubled. In this case, the cross gear 284 does not rotate at all and the assemblies 242 and 272 and cross gears 284 rotate as a unit. Of course, the input shaft speed on one side can be different from that on the other side, in which case the output speed can be varied at will merely by changing the speed and/or direction of an input.

In the planetary system, there are two inputs 182 and 184 and one output 106, the shirring wheel. The concept is to drive the two inputs 182, 184 with the two outputs 196 and 190, respectively, from the differential. Output 196 is the single differential output from the two inputs 230 and 256. As discussed before, the rotation of the output 196 may be clockwise or counterclockwise depending on the relative speeds of the input shafts 230 and 256. But the output of 106 remains constant because the input at 184 varies to compensate exactly for the changes in rotation of 182. This is accomplished using a sun gear attached on input 182 which drives plant gears 176 rotatably attached to the head plate 78 which is driven by the second input 184. Whenever the head is rotated, the gears 176 are caused to rotate around the sun gear 99 in the ratio between the gears 176 and 99. The gear ratios are selected so that a change in output from the head drive is exactly compensated for in the wheel drive by the differential.

It is to be understood that the gears may be selected to provide the desired end result. In order to illustrate how several gear ratios may be employed, there have been provided charts "A" and "B" showing the results of different gear combinations. Charts "A" and "B" are as follows:

CHART "A"

| Wheel Drive Train | | | Head Drive Train | | |
|---|---|---|---|---|---|
| Gear No. | Teeth/Ratio | RPM | Gear No. | Teeth/Ratio | RPM |
| 262 | — | 1200 CCW | 236 | — | 100 CW |
| 264 | 20 }.5 | 600 | 239 | 20 }.5 | 50 |
| 272 | 40 | | 240 | 40 | |
| 276 | 20 }.5 | 300 | 274 | 20 }.5 | 25 (add to 196 because 236 direction is opposite that of 262) |
| 284 | 40 | | 284 | 40 | |
| 196 | 24 }1 | 325 | 230/244 | 36 }1.5 | 75 |
| 182 | 24 | 325 | 250 | 24 | |
| 99 | 48 | | 190 | 20 | |

CHART "A"-continued

| | Wheel Drive Train | | | Head Drive Train | |
|---|---|---|---|---|---|
| Gear No. | Teeth/Ratio | RPM | Gear No. | Teeth/Ratio | RPM |
| | | 975 | | | 25 |
| 176 | 16 | | 184 | 60 | |
| | | −75 | 176 | 16 | |
| | | 900 Net | | | 3  75 (subtract from |
| | | | 99 | 48 | 176 because head |
| | | | | | is driven in CCW direction) |

CHART "B"

| | Wheel Drive Train | | | Head Drive Train | |
|---|---|---|---|---|---|
| Gear No. | Teeth/Ratio | RPM | Gear No. | Teeth/Ratio | RPM |
| 264 | 20 | 1200 | 239 | 20 | 200 (1400) |
| 272 | 40/.5 | 600 | 240 | 40 .5 | 100 (700) |
| 276 | 20 | | 274 | 20 | |
| 284 | 40/.5 | 300 + 50 (350) | 284 | 40 .5 | 50 (350) |
| 196 | 27 | | | | |
| 182 | 24/1.125 | 393.75 (731.25) | 240/244 | 27 | 100 (700) |
| 99 | 48 | | 250 | 16 1.6875 | 168.7 (1181.25) |
| 176 | 18/2.667 | 1050. (1950) | 190 | 20 | — |
| | | −150 (−1050) | 184 | 60 .333 | 56.25 (393.75) |
| | | 900 Net | 99 | 48 | |
| | | | 176 | 18 | 2.667 150 (1050) |

As can be seen, the net RPM at the wheels did not change. It is 900 RPM with the head input zero, 100 or 200 RPM. This is so even when the head drive RPM is greater than the wheel drive RPM as shown in parentheses.

In general, wheel drive input pulley 262 for differential must always be CCW looking at pulley 182. This direction produces the proper rotation of the wheels if head is not spinning. When the head is spun in CCW direction looking at wheels 106 (same direction as belt 198 driving pulley 102), wheel RPM is subtracted at head, but an equivalent amount is added at differential. When the head is spun in the opposite direction, the wheel RPM is increased by the head, but an equivalent amount of RPM is subtracted at the differential. The net result is no change in wheel speed whether the head is spun or not in either direction.

Although the shirring head 42 has been specifically illustrated in conjunction with other well known shirring apparatus, it is to be understood that the shirring head may be utilized in any conventional shirring apparatus environment and is not restricted to the specific environment illustrated in FIG. 1.

It is also to be understood that while the apparatus has been specifically devised for use in simultaneously rotating shirring wheels and rotating the shirring wheels about the axis of a mandrel for the purpose of simultaneously shirring a casing and spinning the casing, the drive mechanism obviously has advantages usable in other machine environments, and it is not intended to so limit this invention to the preferred usage thereof.

In accordance with the foregoing, although only a preferred embodiment of the invention has been specifically illustrated and described herein, it is to be understood that minor variations may be made in the apparatus without departing from the spirit and scope of the invention as defined by the appended claims.

I claim:

1. A right angle drive and support assembly for a rotatable element unit comprising a housing, means on said housing for mounting said housing on a supporting head, bearing means within said housing supporting a drive shaft for rotation within said housing, a support shaft carried by said housing, said drive shaft and said support shaft having axes lying in a common plane with said support shaft axis being at a right angle to said drive shaft axis, said support shaft projecting from said housing and having rotatably mounted thereon a rotatable element including a driven gear, a drive gear carried by said drive shaft and mating with said driven gear in driving relation, a mounting collar fixed with said driven gear, a separately formed shirring wheel, and means for securing said shirring wheel to said mounting collar in angularly adjusted relation, and an anchor pin carried by said housing and extending through said support shaft fixing said support shaft relative to said housing, said anchor pin being coaxial with said drive shaft and said drive shaft having a terminal bore receiving an end of said anchor pin in journalled supported relation.

2. The drive and support assembly of claim 1 wherein said drive shaft extends through said supporting head, and there are bearing means in said supporting head further supporting said drive shaft, and said drive shaft has a free end remote from said housing carrying drive means for said drive shaft.

3. The drive and support assembly of claim 1 wherein there are bearing means between said anchor pin and said drive shaft.

4. The drive and support assembly of claim 1 wherein said support shaft carries means retaining said rotatable element unit on said support shaft.

5. The drive and support assembly of claim 1 wherein said rotatable element unit includes a mounting collar fixed with said driven gear, a separately formed wheel, and means for securing said wheel to said mounting collar in angularly adjusted relation.

6. An apparatus for shirring a tubular film on a shirring mandrel, said apparatus comprising a supporting head, said supporting head including a head plate, a plurality of right angle drive and support assemblies extending from one side of said head plate, drive means for said assemblies on the other side of said head plate, and bearing means supporting said supporting head for rotation about a fixed axis, said bearing means being generally coplanar with said head plate.

7. An apparatus according to claim 6 wherein said supporting head includes a support sleeve extending from a radially central portion of said head plate to said other side, and said drive means including a drive element for commonly driving said assemblies rotatably journalled on said support sleeve.

8. An apparatus according to claim 7 together with drive means for separately rotating said supporting head and said drive element.

9. An apparatus according to claim 6 wherein each of said assemblies include a shirring wheel, there is a shirring mandrel extending through said supporting head, and the relationship of the number of said shirring wheels, the thickness of said shirring wheels, and the circumference of said shirring mandrel being such as to present a shirring surface substantially entirely around the circumference of said shirring mandrel, there being at least five shirring wheels.

10. A machine apparatus for shirring a tubular film comprising a machine component including a head plate, means for mounting said machine component for rotation about an axis, a unit carried by said machine component and including driven elements, said driven elements include means for feeding a film casing, first drive means for rotating said machine component about said axis in a selected direction, second drive means coupled to said unit for driving said driven elements independently of the rotation of said machine component, first and second drive units for driving said first and second drive means, respectively, and a differential drive unit interposed between said drive units and said drive means for modifying the speed of said second drive means in accordance with the speed and direction of drive of said first drive unit.

11. An apparatus according to claim 10 wherein said differential drive unit includes a first output shaft and a second output shaft, a first and a second input shaft, gear elements coupling said first output shaft to said first input shaft for positive driving thereby, and a differential gearing coupling both said first and second input shafts to said second output shaft.

12. An apparatus according to claim 11 wherein said differential gearing is mounted on said second output shaft.

13. An apparatus according to claim 11 wherein said differential gearing is mounted on said second output shaft and includes first and second input gears positively coupled to said first and second input shafts.

14. An apparatus according to claim 11 wherein said differential gearing is mounted on said second output shaft and includes first and second input gears positively coupled to said first and second input shafts, gearing connecting said first input gear to said first output shaft for driving said first output shaft.

15. An apparatus according to claim 11 wherein said input shafts are parallel to one another and said output shafts are parallel to one another.

16. An apparatus according to claim 10 wherein said driven elements are shirring wheels.

17. An apparatus according to claim 10 wherein said driven elements are wheels.

18. A machine apparatus for shirring of tubular film comprising a machine component, means mounting said machine component for rotation about an axis, at least one drive shaft, carrying means for feeding a film casing, carried by said machine component and having an axis disposed parallel to the first mentioned axis, a planetary gearing carried by said machine component and coupled to said drive shaft for rotating said drive shaft independently of the rotation of said machine component about the first mentioned axis, and a differential drive unit coupled to said machine component for the selective rotation of said machine component and the rotation of said drive shaft with the direction and speed of rotation of said machine component being variable while automatically maintaining the speed of rotation of said drive shaft.

19. An apparatus according to claim 18 wherein said differential drive unit includes a first output shaft and a second output shaft, a first and a second input shaft, gear elements coupling said first output shaft to said first input shaft for positive driving thereby, and a differential gearing coupling both said first and second input shafts to said second output shaft.

20. An apparatus according to claim 19 wherein said differential gearing is mounted on said second output shaft and includes first and second input gears positively coupled to said first and second input shafts, gearing connecting said first input gear to said first output shaft for driving said first output shaft.

21. A machine apparatus according to claim 18 wherein said drive shaft carries a shirring wheel.

22. A machine apparatus according to claim 18 wherein said machine component includes a head plate.

23. A machine apparatus according to claim 18 wherein said machine component includes a head plate, and said drive shaft carries a shirring wheel.

24. A machine apparatus according to claim 18 wherein said drive shaft carries a mounting collar, means for feeding a film is a separately formed shirring wheel, and means for securing said shirring wheel to said mounting collar in angularly adjusted relation.

* * * * *